(12) United States Patent
Qiu et al.

(10) Patent No.: US 11,050,307 B1
(45) Date of Patent: Jun. 29, 2021

(54) WIRELESS POWER SYSTEM WITH DEVICE MOVEMENT DETECTION

(71) Applicant: Apple Inc., Cupertino, CA (US)

(72) Inventors: Weihong Qiu, San Ramon, CA (US); Dmitry Berdnikov, San Jose, CA (US); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/798,167

(22) Filed: Feb. 21, 2020

Related U.S. Application Data

(60) Provisional application No. 62/844,657, filed on May 7, 2019.

(51) Int. Cl.
*H02J 50/90* (2016.01)
*H02J 50/40* (2016.01)
*H02J 50/12* (2016.01)

(52) U.S. Cl.
CPC .............. *H02J 50/90* (2016.02); *H02J 50/12* (2016.02); *H02J 50/40* (2016.02)

(58) Field of Classification Search
CPC ............. H02J 50/90; H02J 50/12; H02J 50/40
See application file for complete search history.

(56) References Cited

U.S. PATENT DOCUMENTS

| | | |
|---|---|---|
| 9,337,664 B2 | 5/2016 | Von Novak et al. |
| 10,097,041 B2 | 10/2018 | Jung et al. |
| 2012/0262109 A1 | 10/2012 | Toya et al. |
| 2015/0130409 A1 | 5/2015 | Lee et al. |
| 2019/0337404 A1 | 11/2019 | Matsuo et al. |
| 2020/0044482 A1 | 2/2020 | Partovi et al. |

FOREIGN PATENT DOCUMENTS

WO 2019195882 A1 10/2019

*Primary Examiner* — Robert L Deberadinis
(74) *Attorney, Agent, or Firm* — Treyz Law Group, P.C.; G. Victor Treyz; Joseph F. Guihan

(57) ABSTRACT

A wireless power system has a wireless power transmitting device such as a charging mat with a charging surface and a wireless power receiving device that receives wireless power from coils overlapped by the charging surface. The wireless power transmitting device receives load current and load voltage measurements from the wireless power receiving device and uses this information to produce one or more load lines. The load lines may form a family of load lines each associated with a different respective duty cycle used by inverter circuitry in the wireless power transmitting device in transmitting wireless power signals using the coils. The control circuitry can determine whether the wireless power receiving device has moved by comparing current and voltage information from the wireless power receiving device to the family of load lines and can take appropriate action such as measuring coil inductances for use in subsequent coil selection operations.

22 Claims, 6 Drawing Sheets

WIRELESS POWER SYSTEM WITH DEVICE MOVEMENT DETECTION

This application claims the benefit of provisional patent application No. 62/844,657, filed May 7, 2019, which is hereby incorporated by reference herein in its entirety.

FIELD

This relates generally to power systems, and, more particularly, to wireless power systems for charging electronic devices.

BACKGROUND

In a wireless charging system, a wireless power transmitting device such as a charging mat transmits power to a wireless power receiving device such as a portable electronic device. The portable electronic device has a coil and rectifier circuitry. The coil of the portable electronic device receives alternating-current wireless power signals from the wireless power transmitting device. The rectifier circuitry converts the received signals into direct-current power.

SUMMARY

A wireless power system has a wireless power transmitting device such as a charging mat with a charging surface and a wireless power receiving device that receives wireless power from coils in the wireless power transmitting device that are overlapped by the charging surface.

During operation, the wireless power receiving device uses a current measurement circuit to measure load current and uses a voltage measurement circuit to measure load voltage. Information on load current and voltage is transmitted to the wireless power transmitting device using in-band communications or other wireless communications.

The wireless power transmitting device receives load current and load voltage measurements from the wireless power receiving device and uses this information to produce load lines associated with powering the load of the wireless power receiving device. The load lines are each associated with a different respective duty cycle used by inverter circuitry in the wireless power transmitting device in transmitting wireless power signals using the coils.

The control circuitry can compare current and voltage measurements made in the wireless power receiving device to the load lines. Device movement can be detected when the comparison indicates that the current and voltage measurements deviate from the expected load line by more than a threshold amount. When movement is detected, appropriate action can be taken. For example, the control circuitry may use coil inductance measurement circuitry to gather updated coil inductance measurements. By analyzing the coil inductance measurements, the control circuitry can determine which coils to switch into use in transmitting the wireless power to the wireless power receiving device.

DETAILED DESCRIPTION

Figure 1:
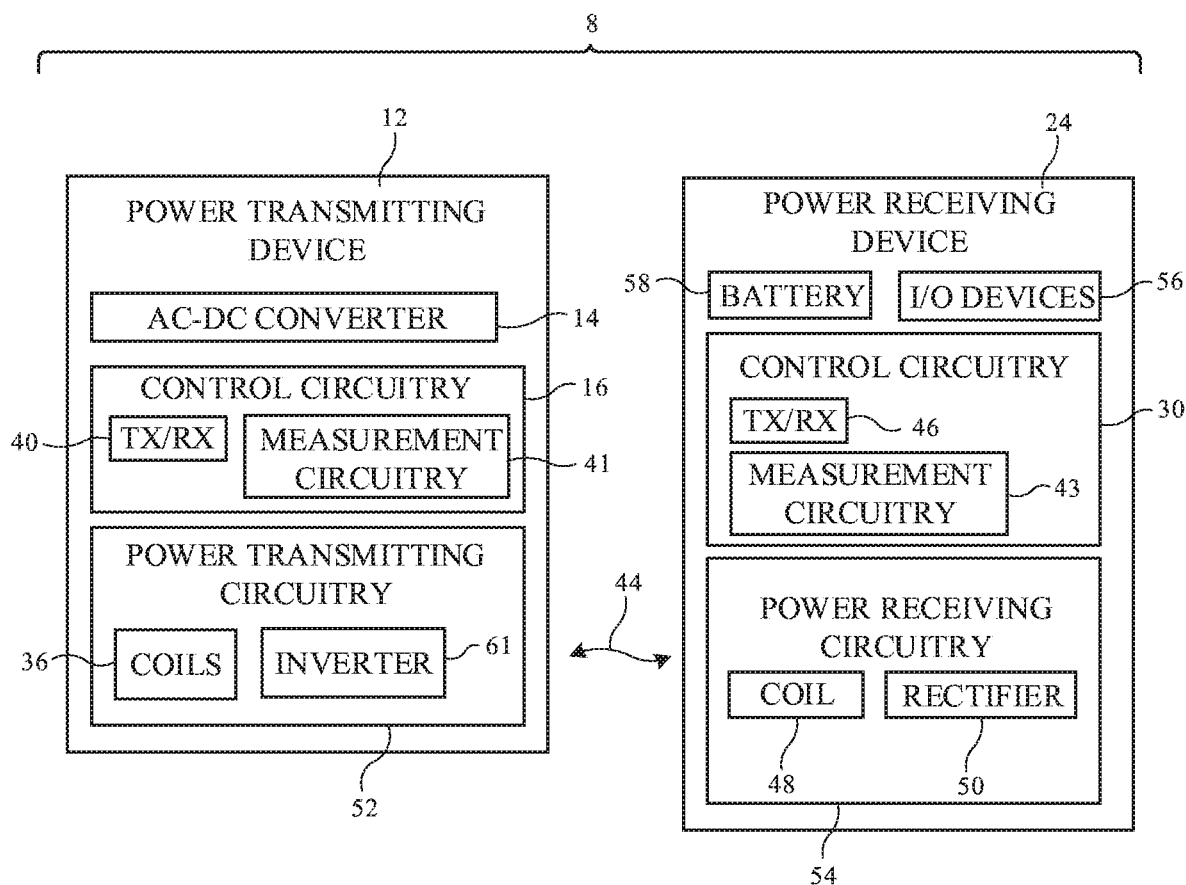
FIG. 1 is a schematic diagram of an illustrative wireless charging system that includes a wireless power transmitting device and a wireless power receiving device in accordance with an embodiment.

A wireless power system includes a wireless power transmitting device such as a wireless charging mat. The wireless power transmitting device wirelessly transmits power to a wireless power receiving device such as a cellular telephone, wristwatch, or other electronic equipment. The wireless power receiving device uses power from the wireless power transmitting device for powering the device and for charging an internal battery.

The wireless power transmitting device interacts with the wireless power receiving device and obtains information on the characteristics of the wireless power receiving device. In some embodiments, the wireless power transmitting device has multiple power transmitting coils overlapped by a charging surface on which a wireless power receiving device may be placed. In such embodiments, the wireless power transmitting device uses information from the wireless power receiving device and/or measurements made in the wireless power transmitting device to determine which coil or coils in the transmitting device are magnetically coupled to wireless power receiving devices. Coil selection is then performed in the wireless power transmitting device. Wireless power is transmitted from the wireless power transmitting device to the wireless power receiving device using selected coil(s) to charge a battery in the wireless power receiving device and/or to power other load circuitry.

The process of making coil measurements such as coil impedance measurements to determine which coils should be used in transmitting power to a wireless power receiving device is sometimes referred to as coil scanning. The coil scanning process consumes time during which wireless power for battery charging and other operations is not generally being transmitted. To help avoid excessive periods of time during which wireless power transmission is interrupted for coil scanning, the wireless power system monitors load current and load voltage in the wireless power receiving device. When the load current and voltage deviates from an expected load line by more than a threshold amount, wireless power transmission may be momentarily halted and coil scanning may be performed or other actions may be taken. In the absence of deviations from the load line, wireless power transfer operations can continue uninterrupted. As a result of this system behavior, small shifts in the location of a wireless power receiving device on the surface of a wireless charging mat that lead to only minor load line deviations will not result in wireless power transmission interruptions. Large changes in the location of a wireless power receiving device such as changes when a user lifts a wireless power receiving device off of a wireless charging mat will result in large deviations of load current and load voltage from the load line and will result in the halting of wireless power transmission and a rescan of the coils. If the coil rescan indicates that a new coil or set of coils should be used in transmitting wireless power, wireless power transmission is resumed using the updated coils. Because the interruption of wireless power transfer in this type of scenario may be relatively brief, wireless charging status information (e.g., an icon or text on a display in the wireless power receiving device, etc.) may be retained on the display of the wireless power receiving device until rescanning of the coils indicates that the wireless power receiving device has been lifted off of the wireless power transmitting device.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data, processing current and voltage measurements, processing user input, handling negotiations between devices 12 and 24, using in-band and/or out-of-band wireless communications circuitry in sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless power transmitting device that includes power adapter circuitry), may be a wireless charging puck or other device that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat having a planar wireless charging surface on which a wireless power receiving device is placed to receive wireless power are sometimes described herein as an example.

Power receiving device 24 may be a portable electronic device such as a cellular telephone, a tablet computer, a wristwatch, a battery case, a wireless accessory (e.g., headphones, a computer stylus, etc.), or other electronic equipment. Power transmitting device 12 may be coupled to a wall outlet (e.g., an alternating current power source) and may use AC-DC converter 14 to produce direct-current (DC) power and/or may have a battery for supplying power. In some embodiments, which are described herein as an example, AC-DC converter 14 is a stand-alone power converter. With this type of arrangement, device 12 is separate from the equipment that includes converter 14 and is connected to converter 14 by a cable.

DC power from converter 14 may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from switches such as transistors) that is turned on and off based on control signals provided by control circuitry 16 to create AC current signals with a desired duty cycle that flow through one or more wireless power transmitting coils such as wireless power transmitting coils 36.

In some arrangements, device 12 may have only a single coil. In other arrangements, device 12 may have multiple coils (e.g., two or more coils, four or more coils, six or more coils, 2-6 coils, fewer than 10 coils, 5-30 coils, fewer than 40 coils, etc.). Coils 36 may be arranged in a planar coil array under a charging surface that overlaps the coils (e.g., in configurations in which device 12 is a wireless charging mat) or may be mounted in the housing of device 10 in other configurations. Coil arrays may be formed from coils that are arranged in multiple overlapping and offset layers. For example, coils 36 may include two, three, or more than three separate layers of coils each having a coil array that is offset from the other. By using multiple layers of coils each of which is shifted laterally with respect to the other, coils 36 can be arranged to provide magnetic field coverage over the charging surface with a desired uniformity. A power transmitting device in which an array of coils 36 is used in providing wireless power through a charging surface may sometimes be referred to as a charging mat.

As the AC currents pass through one or more coils 36, alternating-current electromagnetic (e.g., magnetic) fields (wireless power signals 44) are produced that are received by one or more corresponding receiver coils such as coil(s) 48 in power receiving device 24. When the alternating-current electromagnetic fields are received by coils 48, corresponding alternating-current currents are induced in coils 48. Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50, which is sometime referred to as rectifier output voltage Vrect or load voltage Vo, and accompanying load current Io can be used in powering load circuitry in device 10. For example, the load voltage and load current may be used in charging a battery such as battery 58 and can be used in powering other components in device 24. Device 24 may, as an example, include input-output devices 56 such as a display, touch sensor, communications circuits, audio components, sensors, light-emitting diode status indicators, other light-emitting and light detecting components, and other components and these components (which form a load for device 24) can be powered by the DC voltage produced by rectifier circuitry 50 (and/or DC voltage produced by battery 58).

Device 12 and/or device 24 may communicate wirelessly using in-band or out-of-band communications. Device 12 may, for example, have wireless communications circuitry such as wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless communications circuitry such as wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions. During FSK communications, wireless communications circuitry in control circuitry 16 (e.g., transceiver 40) and/or other wireless communications circuitry may transmit data to device 24 by modulating the frequency of the control signal supplied to inverter 61 (and thereby modulating the frequency of the transmitted wireless power signals). During ASK communications, wireless communications circuitry in control circuitry 16 (e.g., a receiver in transceiver circuitry 40) or other wireless communications circuitry in device 12 may receive data that is transmitted from receiving device 24 to device 12 using a transmitter in device 24 (e.g., a transmitter in transceiver circuitry 46 may modulate the impedance of coil 48, resulting in a corresponding detectable change in the current through coil(s) 36).

It is desirable for power transmitting device 12 and power receiving device 24 to be able to communicate information such as received power, states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has external object measurement circuitry 41 that may be used to detect external objects adjacent to device 12 (e.g., on the top of a charging mat or, if desired, to detect objects adjacent to the coupling surface of a charging puck). Circuitry 41 can detect foreign objects such as coils, paper clips, and other metallic objects and can detect the presence of wireless power receiving devices 24 (e.g., circuitry 41 can detect the presence of one or more coils 48). During object detection and characterization operations, external object measurement circuitry 41 can be used to make measurements on coils 36 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator that can create impulses so that impulse responses can be measured to gather coil inductance information, Q-factor information, etc.) and signal detection circuitry (e.g., filters, analog-to-digital converters, impulse response measurement circuits, etc.). During measurement operations, switching circuitry in device 12 may be adjusted by control circuitry 16 to switch each of coils 36 into use. As each coil 36 is selectively switched into use, control circuitry 16 uses the signal generator circuitry of signal measurement circuitry 41 to apply a probe signal to that coil while using the signal detection circuitry of signal measurement circuitry 41 to measure a corresponding response. Control circuitry 16 also uses measurement circuitry 41 to measure the inductance of each coil 36. Measurement circuitry 43 in control circuitry 30 and/or in control circuitry 16 may also be used in making current and voltage measurements (e.g., so that this information can be used by device 24 and/or device 12). For example, measurement circuitry 43 may include a load current sensor for monitoring a load current in device 24 and may include a load voltage sensor for monitoring a load voltage in device 24. By scanning through all of coils 36 (e.g., by making impedance measurements on each coil 36 in sequence and/or by performing other measurements), device 12 may determine which coils 36 are overlapped by device 24 and are electromagnetically coupled to device 24 so that these coils can be selected and switched into use in transmitting wireless power signals to device 24.

Figure 2:
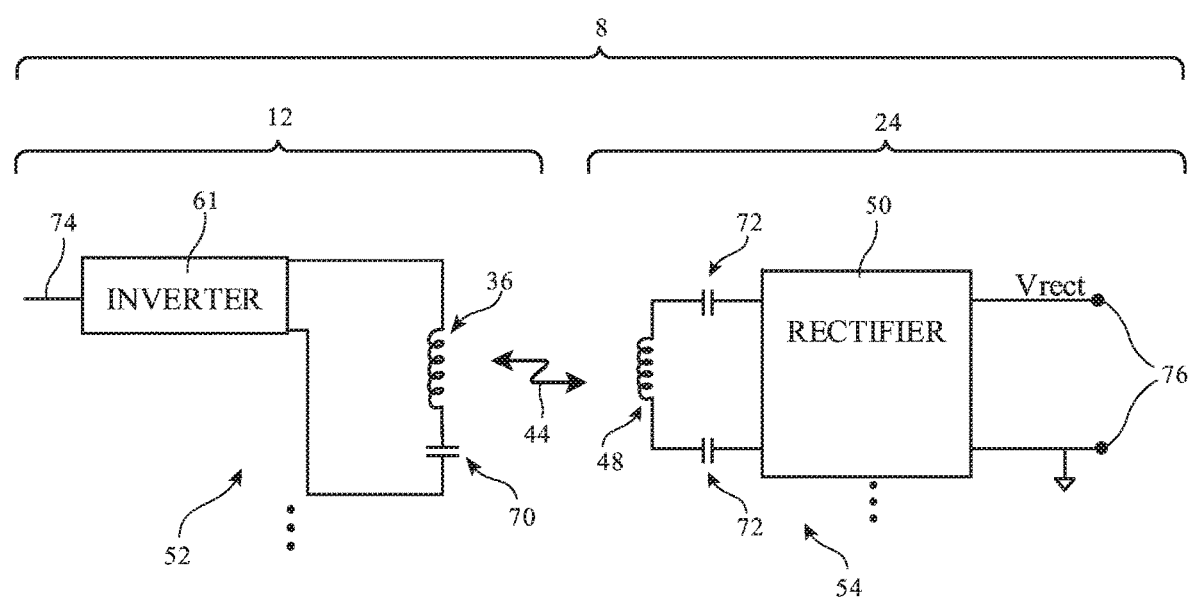
FIG. 2 is a circuit diagram of wireless power transmitting and receiving circuitry in accordance with an embodiment.

FIG. 2 is a circuit diagram of illustrative wireless charging circuitry for system 8. As shown in FIG. 2, circuitry 52 may include inverter circuitry such as one or more inverters 61 or other drive circuitry that produces wireless power signals that are transmitted through an output circuit that includes one or more coils 36 and capacitors such as capacitor 70. In some embodiments, device 12 may include multiple individually controlled inverters 61, each of which supplies drive signals to a respective coil 36. In other embodiments, an inverter 61 is shared between multiple coils 36 using switching circuitry.

During operation, control signals for inverter(s) 61 are provided by control circuitry 16 at control input 74. A single inverter 61 and single coil 36 is shown in the example of FIG. 2, but multiple inverters 61 and multiple coils 36 may be used, if desired. In a multiple coil configuration, switching circuitry (e.g., multiplexer circuitry) can be used to couple a single inverter 61 to multiple coils 36 and/or each coil 36 may be coupled to a respective inverter 61. During wireless power transmission operations, transistors in one or more selected inverters 61 are driven by AC control signals from control circuitry 16 having a desired duty cycle. In some embodiments, the relative phase between the inverters can be adjusted dynamically (e.g., a pair of inverters 61 may produce output signals in phase or out of phase (e.g., 180° out of phase). Duty cycle can be adjusted dynamically to help adjust power transmission levels.

The application of alternating-current drive signals using inverter(s) 61 (e.g., transistors or other switches in circuitry 52) causes the output circuits formed from selected coils 36 and capacitors 70 to produce electromagnetic fields (signals 44) that are received by wireless power receiving circuitry 54 using a wireless power receiving circuit formed from one or more coils 48 and one or more capacitors 72 in device 24.

During startup operations, device 24 can monitor the output voltage Vo of rectifier 50 and can monitor the output current Io. Output voltage Vo (e.g., Vrect in FIG. 2) is sometimes referred to as a load voltage, because this voltage is applied to load circuitry in device 24 such as battery charging circuitry, display circuitry, control circuitry, and other electrical components in device 24. Output current Io, which flows through the load components coupled between terminals 76, is sometimes referred to as a load current.

When wireless power transfer is being initiated in system 8 (e.g., during startup operations), wireless power system 8 can be represented by an equivalent circuit having a power source with one internal impedance. When the power source and the internal impedance are constant, the output voltage Vo can be calculated using the load line equation of equation (1).

$$Vo = AVin + BIo \qquad (1)$$

In equation 1, Vin is the voltage associated with the AC signals produced by inverter 61 (FIG. 2) and A and B are unknown constants. During startup operations, multiple samples of Io and Vo values may be obtained by control circuitry 30. For example, a first current Io1 and a first associated voltage Vo1 (sometimes collectively referred to as first operating point P1) may be gathered and a second current Io2 and a second associated voltage Vo2 (sometimes collectively referred to as second operating point P2) may be gathered. These points fall on a load line associated with the equivalent circuitry of the wireless power system, as shown by load line 80 of FIG. 3.

From the two operating points P1 and P2, equations (2) and (3) may be obtained, respectively. Equation (4) shows how the voltage Vin that is produced at the output of inverter 16 is a function of the duty cycle of the drive signal applied to coil(s) 36.

$$Vo1 = AVin1 + BIo1 \qquad (2)$$

$$Vo2 = AVin2 + BIo2 \qquad (3)$$

$$Vin = Vdc * \sin(DC/\pi) \qquad (4)$$

In equation (4), Vin is a function of the magnitude (direct-current voltage Vdc) of the signal produced by inverter 61 and DC is the duty cycle of the signal produced by inverter 61. Using equations (2) and (3), the values of constants A and B may obtained and substituted into equation (1). This produces load line 80 of FIG. 3.

After the load line data is obtained, this information may be provided to wireless power transmitting device 12. For example, device 24 may transmit load line data to device 12 with ASK in-band communications using coil 48 and coil(s) 36 or with other suitable data communications. Device 24 may then use the load line that is received from device 24 to determine whether device 24 has been moved relative to device 12.

In particular, control circuitry 16 may periodically obtain load current and load voltage measurements (Io and Vo measurements made by measurement circuitry in device 24) from device 24 and may compare these measurements to the load line to determine whether device 24 is operating in its original position or has been moved. Device 24 may make these measurements continually and may send the measurements to device 24 continually via ASK.

Figure 3:
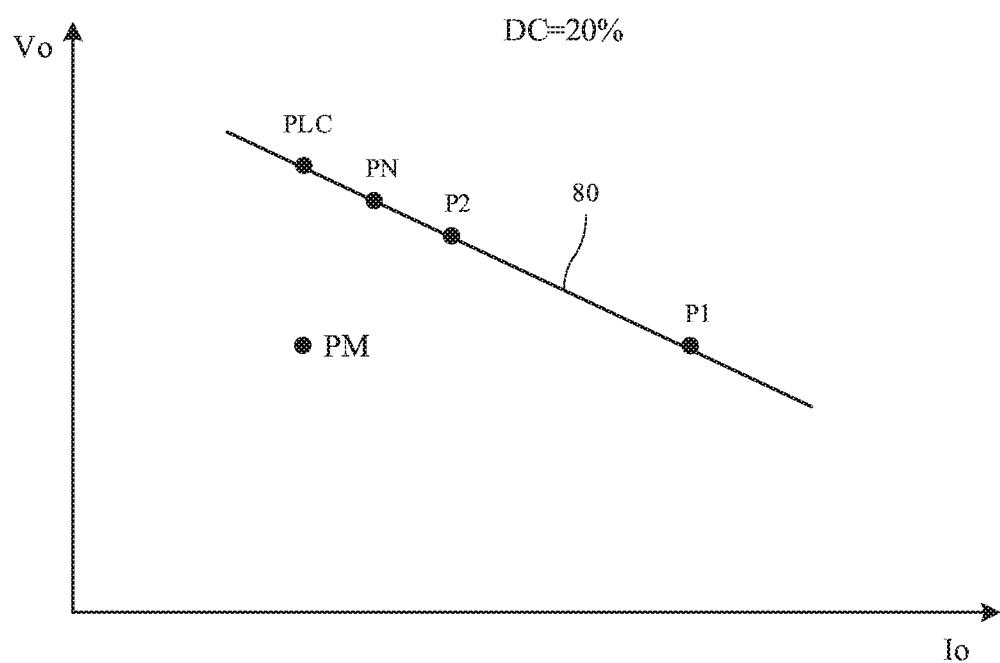
FIG. 3 is a graph of an illustrative load line associated with powering a load in a wireless power receiving device in a wireless power system in accordance with an embodiment.

During normal operation, while power is being transmitted from device 12 to device 24, device 24 may be characterized by an Io and Vo values corresponding to a normal operating point that falls on load line 80 (e.g., normal operating point PN in the example of FIG. 3). If device 24 experiences a load change due to a change in operation in the load circuitry receiving current Io and voltage Vo, a subsequent measurement of Io and Vo by device 24 will produce a point such as point PLC of FIG. 3, which still lies on load line 80. Accordingly, as device 24 periodically experience changes in load during normal operation, these load changes will result in operating points that remain on the load line established during the initial start operations (e.g., when points P1 and P2 of FIG. 3 were sampled). No action need be taken in system 8 so long as normal operation is detected and movement of device 24 is not detected.

If, however, device 24 is moved relative to device 12, the operating point indicated by current Io and Vo may no longer lie on line 80. As an example, current Io may remain relatively unchanged while voltage Vo drops, causing the operating point to move off of line 80 as indicated by illustrative operating point PM in FIG. 3. When this condition is detected by control circuitry 16, control circuitry 16 can take appropriate action. For example, when PM (e.g., the measured load current and load voltage) is off of load line 80 by more than a threshold amount, which may occur, as an example, in response to a user lifting device 24 away from device 12, device 12 can stop wireless power transmission (e.g., the transmission of wireless power signals from device 12 to device 24 can be halted). When transmission is halted in this way, device 12 can rescan coils 36 (e.g., to determine whether a new coil or new set of coils should be selected to transmit wireless power). In some embodiments, device 12 detects that device 24 has been moved due to a shift in the operating point of device 24 off of load line 80, control circuitry 16 in device 12 may use measurement circuitry 41 to measure the inductance of each of coils 36 so that appropriate coil(s) 36 can be switched into use in transmitting power to device 12 (if device 12 is still present on the charging surface of device 24). If the rescan does not identify any coil(s) 36 that are overlapped by coil 48, wireless power transmission may remain halted. If the rescan identifies updated overlapped coil(s) 36, the updated coil information may be used in switching selected coils into use so that wireless power transmission can be resumed. In some embodiments, if operation of device 24 has shifted off of load line 80, system 8 may inform a user that device 24 has been moved and that the wireless power transfer capabilities of system 8 have been affected. For example, device 12 may, in response to detecting movement of device 24, send a wireless instruction to device 24 or otherwise cause device 12 to present a user interface affordance informing the user of reduce wireless power transfer capabilities (e.g., the display of device 24 may display a message such as "wireless charging rate has been impacted due to device movement"). In some embodiments, device 24 may present a user interface affordance indicating that shifting of device 24 has impacted wireless charging power levels. For example, if Vo drops but remains within a useful value for supplying power to the electronics of device 24, the user interface affordance(s) can indicate that the device is operating at a lower wireless charging power level. In some embodiments, the user interface affordance indicating shifting of device 24 has impacted wireless charging power levels is displayed responsive to movement exceeding a first threshold. Optionally, responsive to movement exceeding a second threshold, device 24 may display a user interface affordance, other than the charging status indicator, that indicates that wireless charging has halted. If a charging status indicator is being displayed by device 24 and movement of device 24 is sufficient to cause device 12 to halt wireless power transmission, device 12 can cause device 24 to display a user interface affordance indicating that wireless power transmission have been halted (e.g., due to movement) and can cause device 24 to remove the previously displayed charging status indicator. Device 24 may, in some embodiments, detect that wireless power transmission has been interrupted and can remove the displayed charging status indicator in response to detection of interruption of the wireless power transmission.

Small deviations from the load line (e.g., deviations less than the threshold which may result from small shifts of the position of device 24 across the surface of device 24) need not trigger rescanning operations (e.g., power transmission may be maintained at its current level without readjusting which coil(s) 36 to use to transmit the wireless power).

Figure 4:
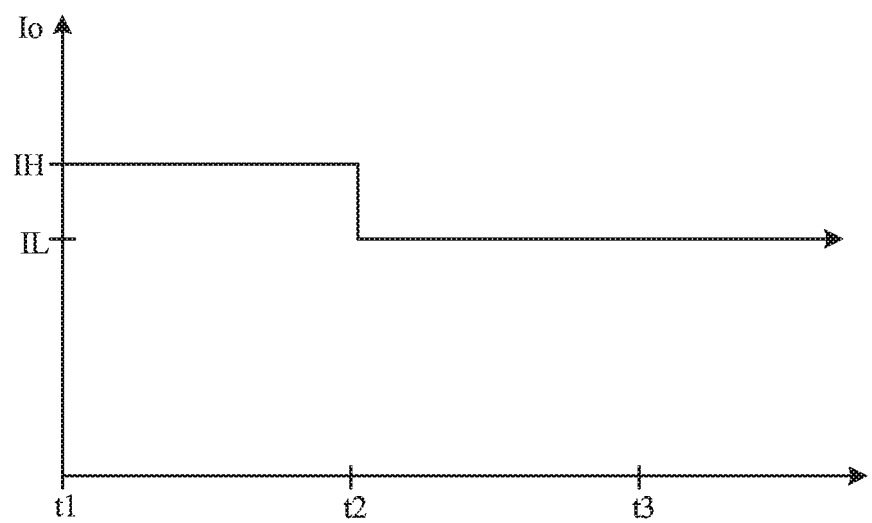
FIG. 4 is a graph of an illustrative load current in a wireless power receiving device in accordance with an embodiment.
Figure 5:
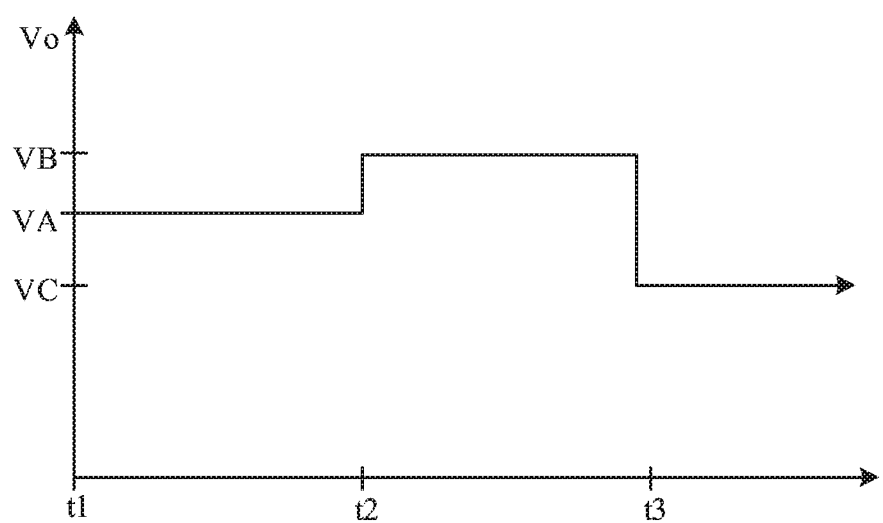
FIG. 5 is a graph of an illustrative load voltage in a wireless power receiving device in accordance with an embodiment.

The graphs of FIGS. 4 and 5 illustrate operation at a normal operating point PN on load line 80 (e.g., between times t1 and t2 where Io is equal to IH and Vo is equal to VA). At time t2, the load in device 24 changes (e.g., a component in the load circuitry of device 24 is switched off in this example). This causes current Io to drop to IL and causes voltage Vo to rise to VB, corresponding to a new operating point on load line 80 (e.g., point PLC of FIG. 3). At time t3, a user moves device 24 relative to device 12, causing Vo to drop to VC while Io remains at IL. This new condition corresponds to illustrative operating point PM of FIG. 3, which is not on load line 80. In response to determining that the operating point of device 24 deviates from the expected load line behavior of device 24 by more than a threshold amount (as illustrated by point PM), device 12 can halt power transmission, perform a coil rescan (e.g., to select new coil(s) to use in transmitting power), and/or can take other suitable action.

During operation of system 8, power transfer may be regulated by adjusting the duty cycle (DC) of the alternating-current drive signals supplied to coil(s) 36 by inverter 61. The duty cycle of inverter 61 is controlled by the duty cycle of the control signals applied to control input 74 of inverter 61 by control circuitry 16. Control circuitry 16 can adjust the duty cycle of the control signals supplied to input 74 to control the duty cycle of the AC drive signal output from inverter 61.

In the example of FIG. 3, the duty cycle (DC) of the alternating-current drive signal supplied to coil(s) 36 by inverter 61 is fixed (e.g., 20%). In some embodiments, the duty cycle of the output of inverter 61 varies. As a result, system 8 may collect multiple sets of operating points P1 and P2 corresponding to multiple different duty cycle settings. For example, at a first duty cycle setting (e.g., 5%), a first set of current and voltage measurements Io1 and Vo1 may be collected and at a second duty cycle setting (e.g., 10%), a second set of current and voltage measurements Io2 and Vo2 may be collected. In equations (5) and (6), Vin1 is computed for a 5% duty cycle and Vin2 is computed for a 10% duty cycle. Additional measurements of output current and voltage in device 24 can be collected at additional duty cycles. The collected operating point data can be provided to device 12 to allow device 12 to produce a family of load lines to use in evaluating whether device 24 is moved relative to device 12 during operation.

$$Vo1 = A Vin1 + B Io1 \quad (5)$$

$$Vo2 = A Vin2 + B Io2 \quad (6)$$

Figure 6:
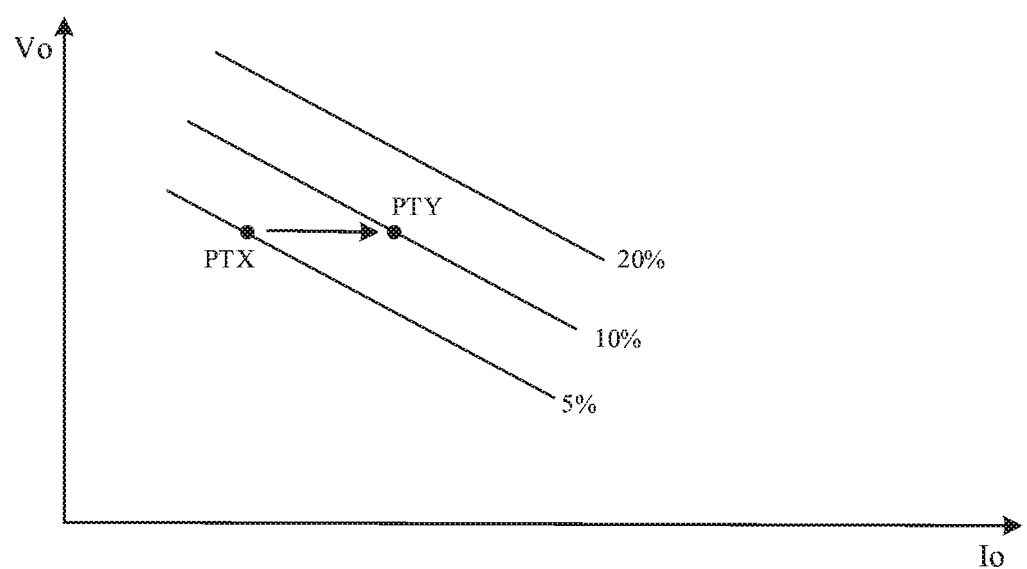
FIG. 6 is graph of a set of illustrative load lines associated with a wireless power system in accordance with an embodiment.

In particular, from points such as the operating point of equation (5) and the operating point of equation (6) (and, if desired, additional operating points at different duty cycles) and using equations (1) and (4), the family of load lines at different respective duty cycles may be produced by device 12 (e.g., control circuitry 16). An illustrative load line family with load lines at 5%, 10%, and 15% is shown in the example of FIG. 6. Other numbers of load lines may be gathered, if desired.

The load line families that are produced are used in conjunction with information on the present duty cycle of inverter 61 (which is known to control circuitry 16) to determine when device 24 is operating normally. Consider, as an example, operating points PTX and PTY in the example of FIG. 6. Initially, device 24 may be operating at point PTX while device 12 is operating with a 5% duty cycle. The load current and voltage readings of device 24 while operating at operating point PTX are passed to device 12 using ASK in-band communications or other communications. Device 12, knowing the current duty cycle of inverter 61, determines that point PTX lies on the 5% duty cycle load line in the family of load lines as expected for normal operation at a 5% duty cycle. The duty cycle of inverter 61 is subsequently changed to 10% and the operating point of device 24 changes to that of operating point PTY. The measured output current and voltage of device 24 for operating point PTY while device 24 is operating at the 10% duty cycle are passed to device 12 and compared to the 10% duty cycle load line. So long as the measured operating point of device 24 lies on the load line for the current duty cycle (within a predetermined threshold amount), device 12 can conclude that device 24 has not been moved and is operating normally, even in the event that the operating point changes due to changes in the load in device 24. If, however, the measured operating point of device 24 (e.g., output current Io and output voltage Vo) deviates from the load line for the current duty cycle being used by inverter 61 by more than the threshold amount, device 12 can conclude that device 24 has been moved and can take appropriate action.

Figure 7:
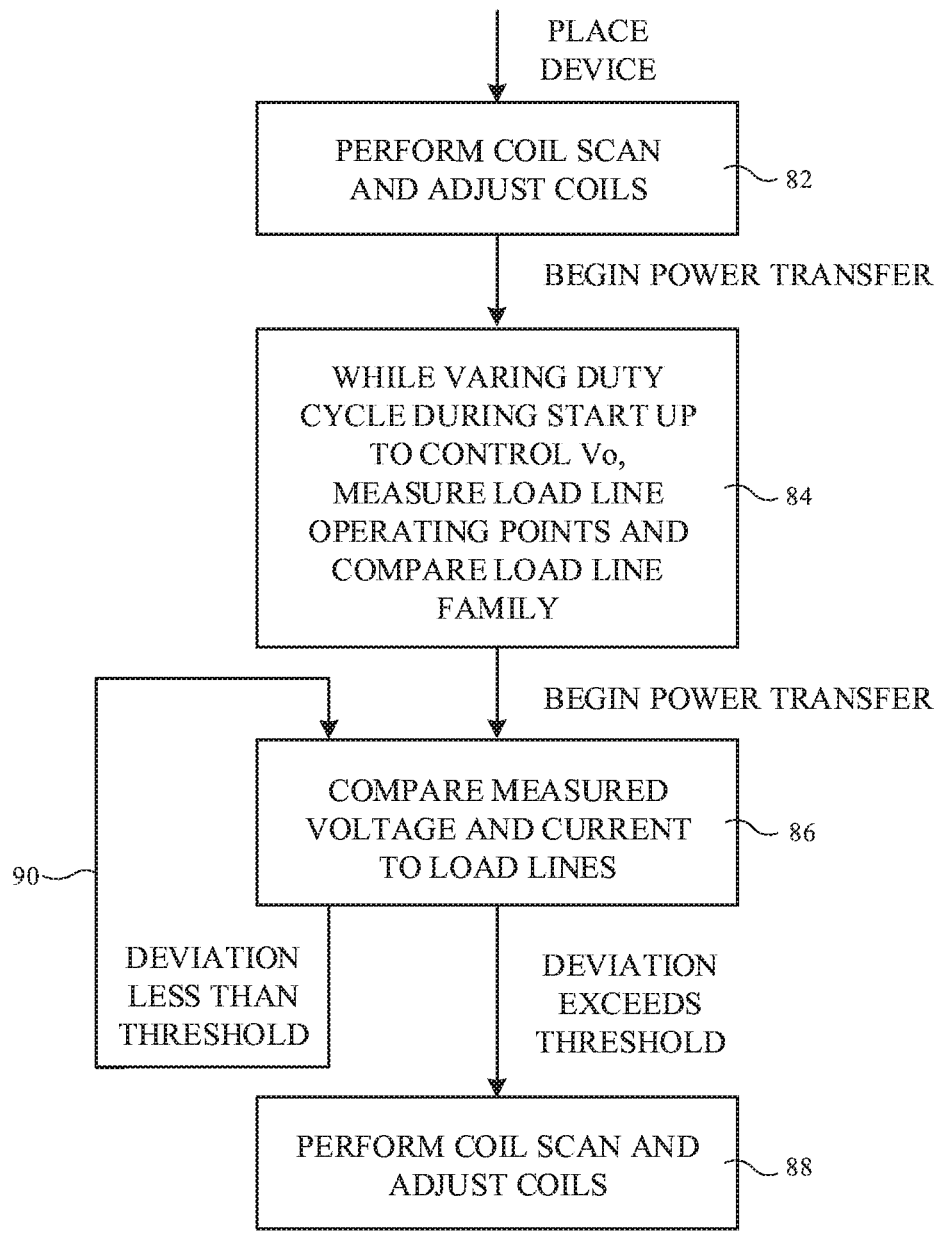
FIG. 7 is a flow chart of illustrative steps involved in operating a wireless power system in accordance with an embodiment.

Illustrative operations involved in using system 8 are shown in FIG. 7.

During the operations of block 82, device 12 (control circuitry 16) uses measurement circuitry 41 to measure the coil impedance of each of coils 36. The measurement process, which may sometimes be referred to as a coil scan, reveals which coil(s) have enlarged inductance values due to the overlap of coil 48 of device 24. After identifying which coil(s) 36 are overlapped by coil 48 (and which are therefore electromagnetically coupled to coil 48), control circuitry 16 can adjust switching and/or inverter circuitry in device 12 to select the overlapped coils. The coil(s) 36 that are switched into use begin transmitting wireless power signals 44 to device 24.

During the operations of block 84, startup operations may be performed (e.g., the output power of device 12 can be ramped up so the normal wireless power operations can be performed). Control circuitry 16 may, if desired, vary the duty cycle DC of inverter 16 to help control output voltage Vo in device 24. Device 24 can send load current and load voltage measurements (e.g., Io and Vo) to device 12 using in-band communications such as ASK communications and/or other wired communications. During startup operations, multiple load line operating points may be gathered and the family of load line curves of FIG. 6 calculated (e.g., by control circuitry 16 or other control circuitry in system 8).

Once normal wireless power transfer conditions are reached, system 8 may transfer wireless power normally. The duty cycle DC of inverter 61 may be varied during operation to control voltage Vo in device 24 under a variety of operating conditions. The known duty cycle of inverter 61 is used to identify the load line of FIG. 6 that corresponds to the current operating state of system 8. Each operating point (e.g., each current Io and voltage Vo pair) that is received by device 12 can be compared by device 12 to the identified load line for the current duty cycle. So long as the operating points lie on the load line (within a threshold amount), normal operations can continue at block 86, even if the load in device 24 changes, as indicated by line 90. As a result of this behavior, it is possible that some movements (e.g., slight movements) of device 24 across the surface of device 12 will result in uninterrupted normal wireless power transmission.

If device 12 determines during a comparison of an operating point to the identified load line that the operating point (load current and voltage) deviates from the identified load line by more than the threshold amount (as may occur, for example, if a larger movement of device 24 is detected such as when a user lifts device 24 off of the charging surface of device 12 or when a user moves device 24 substantially along the charging surface), device 12 (control circuitry 16) may respond by taking suitable action during the operations of block 88.

As an example, device 12 may halt wireless power transmission during the operations of block 88. Device 12 may then perform a coil scan on coils 36 (measuring the inductance of each coil 36). If the coil scan reveals that device 24 has been moved away from device 12 (e.g., device 24 has been lifted from the charging surface of device 12), wireless power transmission may remain halted. If the coil scan reveals that device 24 was moved to a different location on the charging surface of device 12 and is now overlapping different coil(s) 36 or is overlapping some or all of the same coil(s) 36 but with differing amounts of overlap, appropriately updated coil(s) 36 can be switched into use and used in transmitting wireless power from device 12 to device 24 (e.g., an updated set of coils 36 may be selected based on the result of the new coil scan and wireless power transmission may be resumed).

The foregoing is merely illustrative and various modifications can be made to the described embodiments. The foregoing embodiments may be implemented individually or in any combination.

What is claimed is:

1. A wireless power transmitting device configured to wirelessly transmit power to a wireless power receiving device, comprising:
   one or more coils overlapped by a charging surface;
   inverter circuitry configured to wirelessly transmit power using the coils; and
   control circuitry configured to use current and voltage information received from the wireless power receiving device to control the inverter circuitry, wherein:
      in response to the wireless power receiving device being lifted away from the one or more coils, the control circuitry causes the inverter circuitry to halt wireless power transmission; and
      in response to at least one movement of the wireless power receiving device along the charging surface, the control circuitry does not cause the inverter circuitry to halt wireless power transmission.

2. The wireless power transmitting device of claim 1 further comprising measurement circuitry configured to measure one or more coil inductances associated respectively with the one or more coils, wherein the control circuitry is configured to use the measurement circuitry to measure the one or more coil inductances in response to detecting the lifting of the wireless power receiving device away from the charging surface using the current and voltage information.

3. The wireless power transmitting device of claim 2 further comprising wireless communications circuitry configured to use the one or more coils to receive the current and voltage information from the wireless power receiving device.

4. The wireless power transmitting device of claim 3 wherein the control circuitry is configured to use the current and voltage information received from the wireless power receiving device to produce a load line associated with a load of the wireless power receiving device.

5. The wireless power transmitting device of claim 4 wherein the control circuitry is configured to detect the lifting of the wireless power receiving device away from the charging surface by comparing a measured load current and a measured load voltage from the wireless power receiving device to the load line.

6. The wireless power transmitting device of claim 5 wherein the control circuitry is configured to:
   maintain wireless power transmission to the wireless power receiving device in response to a first movement of the wireless power receiving device along the charging surface; and
   halt wireless power transmission in response to a second movement of the wireless power receiving device along the charging surface.

7. The wireless power transmitting device of claim 6 wherein the first movement is associated with a deviation of the measured load current and the measured load voltage from the load line by less than a threshold and wherein the second movement is associated with a deviation of the measured load current and the measured load voltage from the load line by more than the threshold.

8. The wireless power transmitting device of claim 6 wherein the control circuitry is configured to:
   in response to the first movement, cause the wireless power receiving device to display a user interface affordance indicating reduced wireless charging capabilities.

9. The wireless power transmitting device of claim 6 wherein the control circuitry is configured to:
   in response to the second movement, cause the wireless power receiving device to display a user interface affordance indicating halting of the wireless power transmission and cause the wireless power receiving device to remove a displayed charging status indicator.

10. The wireless power transmitting device of claim 1 further comprising wireless communications circuitry configured to use the one or more coils to receive the current and voltage information from the wireless power receiving device, wherein the control circuitry is configured to use the current and voltage information received from the wireless power receiving device to produce a family of load lines associated with a load in the wireless power receiving device, and wherein each load line in the family of load lines is associated with use by the inverter circuitry of a different respective duty cycle when supplying signals to the one or more coils.

11. A wireless power transmitting device configured to wirelessly transmit power to a wireless power receiving device, comprising:
   one or more coils overlapped by a charging surface;
   measurement circuitry configured to measure one or more coil inductances respectively associated with the one or more coils;

inverter circuitry configured to wirelessly transmit power using the one or more coils; and control circuitry configured to use current and voltage information received from the wireless power receiving device to detect movement of the wireless power receiving device relative to the charging surface and to control the inverter circuitry, wherein:

in response to movement of the wireless power receiving device along the charging surface detected by the control circuitry using the current and voltage information, the control circuitry uses the measurement circuitry to measure the one or more coil inductances.

12. The wireless power transmitting device of claim 11 wherein the control circuitry is configured to use the current and voltage information received from the wireless power receiving device to produce a family of load lines associated with a load in the wireless power receiving device, wherein each load line in the family of load lines is associated with use by the inverter circuitry of a different respective duty cycle when supplying signals to the one or more coils.

13. The wireless power transmitting device of claim 12 wherein the control circuitry is configured to detect the movement of the wireless power receiving device using the family of load lines.

14. The wireless power transmitting device of claim 13 wherein the control circuitry is configured to use the family of load lines to detect the movement by comparing a load current and a load voltage received from the wireless power receiving device to a load line in the family of load lines that is associated with a duty cycle being used by the inverter circuitry to wirelessly transmit the power.

15. A wireless power transmitting device configured to wirelessly transmit power to a wireless power receiving device, comprising:

at least one coil;

inverter circuitry configured to wirelessly transmit power using the at least one coil; and control circuitry configured to:

receive current and voltage measurements from the wireless power receiving device using the at least one coil;

produce a load line associated with a load in the wireless power receiving device using the received current and voltage measurements from the wireless power receiving device; and at least partly based on the load line, cause the wireless power receiving device to display a user interface affordance.

16. The wireless power transmitting device of claim 15 wherein the control circuitry is configured to:

detect a first movement of the wireless power receiving device by identifying from a first deviation between the load line and measured load current and measured load voltages from the wireless power receiving device; and detect a second movement of the wireless power receiving device by identifying a second deviation between the load line and measured load current and measured load voltages from the wireless power receiving device.

17. The wireless power transmitting device of claim 16 wherein the control circuitry is configured to cause the wireless power receiving device to display a user interface affordance indicating reduced wireless charging capabilities in response to detecting the first movement.

18. The wireless power transmitting device of claim 16 wherein the control circuitry is configured to cause the wireless power receiving device to display a user interface affordance indicating halting of wireless charging capabilities in response to detecting the second movement.

19. The wireless power transmitting device of claim 16 wherein the control circuitry is configured to:

compare a received current and voltage measurement to the load line; and cause the wireless power receiving device to display the user interface affordance based on the comparison.

20. The wireless power transmitting device of claim 19 wherein the control circuitry is configured to:

in response to determining that a current and voltage measurement deviates from the load line by less than a threshold amount during the comparison, wirelessly transmit power to the wireless power receiving device by using the inverter circuitry to supply a signal to the at least one coil.

21. The wireless power transmitting device of claim 19 further comprising measurement circuitry configured to measure inductance associated with the at least one coil, wherein the control circuitry is configured to:

in response to determining that a current and voltage measurement deviates from the load line by more than a threshold amount during the comparison, halt wirelessly transmitting power to the wireless power receiving device and use the measurement circuitry to measure the inductance information associated with the at least one coil.

22. The wireless power transmitting device of claim 15 wherein the control circuitry is configured to produce a family of load lines including the load line, wherein the family of load lines is associated with the load in the wireless power receiving device, and wherein each load line in the family of load lines is associated with use by the inverter circuitry of a different respective duty cycle when supplying signals to the at least one coil.

* * * * *